United States Patent
Konrad et al.

(10) Patent No.: US 8,430,077 B2
(45) Date of Patent: Apr. 30, 2013

(54) METHOD FOR PRODUCING A PISTON FOR AN INTERNAL COMBUSTION ENGINE AND PISTON FOR AN INTERNAL COMBUSTION ENGINE

(75) Inventors: Peter Konrad, Pegnitz (DE); Arnd Baberg, Zirndorf (DE); Marc-Manuel Matz, Friedberg (DE); Peter Godel, Freienried (DE); Werner Trubenbach, Obergreisbach (DE)

(73) Assignee: Federal-Mogul Nurnberg GmbH, Nurnberg (DE)

( * ) Notice: Subject to any disclaimer, the term of this patent is extended or adjusted under 35 U.S.C. 154(b) by 135 days.

(21) Appl. No.: 13/000,123

(22) PCT Filed: Jun. 12, 2009

(86) PCT No.: PCT/EP2009/057277
§ 371 (c)(1),
(2), (4) Date: Apr. 25, 2011

(87) PCT Pub. No.: WO2009/153217
PCT Pub. Date: Dec. 23, 2009

(65) Prior Publication Data
US 2011/0186003 A1   Aug. 4, 2011

(30) Foreign Application Priority Data
Jun. 20, 2008   (DE) .......................... 10 2008 002 572

(51) Int. Cl.
*B23P 15/08* (2006.01)
(52) U.S. Cl.
USPC ................................ 123/193.6; 29/888.049

(58) Field of Classification Search ............ 92/223, 92/228, 229; 29/888.048, 888.049; 123/193.6; 427/421, 426
See application file for complete search history.

(56) References Cited

U.S. PATENT DOCUMENTS

| | | | |
|---|---|---|---|
| 3,715,790 A * | 2/1973 | Reinberger | 29/888.048 |
| 3,947,607 A | 3/1976 | Gazzard et al. | |
| 4,008,051 A * | 2/1977 | Cadle | 428/553 |
| 4,334,507 A | 6/1982 | Kohnert et al. | |
| 4,364,159 A | 12/1982 | Holcombe | |
| 4,562,327 A | 12/1985 | Mielke | |
| 4,643,078 A | 2/1987 | Ban | |
| 5,653,021 A * | 8/1997 | Matsuyama et al. | 29/888.049 |
| 5,756,150 A * | 5/1998 | Mori et al. | 427/197 |
| 6,671,943 B1 * | 1/2004 | Mori et al. | 29/527.2 |
| 8,153,204 B2 * | 4/2012 | Kulkarni | 427/454 |
| 2007/0000129 A1 | 1/2007 | Hahn et al. | |

FOREIGN PATENT DOCUMENTS

DE    358074   9/1922
DE    24 25 358 A1   12/1974

(Continued)

*Primary Examiner* — M. McMahon
(74) *Attorney, Agent, or Firm* — Robert L. Stearns; Dickinson Wright, PLLC

(57) ABSTRACT

In a method for producing a piston for an internal combustion engine, at least the region of the upper annular groove is at least partially recessed, an adhesion promoter layer containing aluminum is then applied, a wear-resistant layer is thermally sprayed onto said adhesion promoter layer and at least the upper annular groove is at least partially formed in said layers. The invention also relates to a piston for an internal combustion engine that comprises a base material, an adhesion promoter layer that contains aluminum and is applied to at least some regions of said material and a wear-resistant layer that is thermally sprayed onto said adhesion promoter layer. At least the upper annular groove is at lest partially formed in said layers.

17 Claims, 1 Drawing Sheet

FOREIGN PATENT DOCUMENTS

| | | |
|---|---|---|
| DE | 3246630 A1 | 6/1984 |
| DE | 103 08 561 A1 | 9/2004 |
| EP | 0937888 A2 | 8/1999 |
| GB | 2200583 A | 8/1988 |
| WO | WO 2004/106721 A1 | 12/2004 |
| WO | WO 2007/039011 A1 | 4/2007 |

* cited by examiner

METHOD FOR PRODUCING A PISTON FOR AN INTERNAL COMBUSTION ENGINE AND PISTON FOR AN INTERNAL COMBUSTION ENGINE

TECHNICAL FIELD

The invention relates to a method for producing a piston for an internal combustion engine as well as to such a piston.

In the development of engines that become ever smaller and more powerful, the pistons employed are subject to increasing pressure and temperature loads. In particular, in this context the upper annular groove provided for inserting a piston ring is especially subject to stress. Further, it is an aim of engine design to minimize the dead space volume, which implies a reduction of the height of the fire land.

PRIOR ART

Document U.S. Pat. No. 5,756,150 describes a piston, wherein a piston blank having a groove is used, which is larger than the annular groove provided on the subsequent piston. This comparatively large groove is filled with two sprayed-on layers, and subsequently the annular groove is formed.

A similar method which may, for example, be performed with the aid of an electric arc spray gun, is described in document DE 2 425 358 A.

Document DE 32 46 630 A1 concerns also a similar method, wherein a groove that is larger than the later annular groove is filled with a silicon-containing aluminium alloy.

SUMMARY OF THE INVENTION

It is an object of the invention to provide a method for producing a piston for an internal combustion engine, by means of which a piston for an internal combustion engine may be produced, which is improved as to its wear characteristics, in particular in the region of the upper annular groove. Further, a corresponding piston is to be provided.

Accordingly, in the production of a piston at least a region of the upper annular groove is at least partially recessed. In other words, the region of the annular groove is recessed either already during production of a piston blank, for example during casting, i.e. a recess or the like can be found in the region in which the upper annular groove is later to be formed. Alternatively, or in addition thereto, the region of the upper annular groove in the piston blank may be completely or partially present, and the material of the piston blank is removed in the region of the future upper annular groove, for example by means of machining. In particular, the described recess is preferably at least a little larger than the future upper annular groove, in order to be able to perform the subsequent steps.

According to the invention, an adhesion-promoting layer containing aluminium is subsequently applied. It has been found for such a layer that a wear protection layer subsequently applied according to the invention by thermal spraying makes a particularly good bond with the piston material. The above-described adhesion promoting layer may be applied by means of all methods of application that are previously and subsequently indicated for the wear protection layer. Subsequently, at least the upper annular groove is at least partially formed out of the wear protection layer. In other words, the shoulders (flanks) and/or the base of the upper ring groove are at least partially formed by the material of the wear protection layer so that the groove, which in use receives the upper piston ring, withstands the particularly high surface pressure, and the region surrounding the groove meets the requirements regarding pressure and temperature stress particularly well. According to the invention, this is aided by the adhesion promoting layer.

As regards the application of the adhesion promoting and/or wear protection layer one may say that the substrate material, that is the material of the piston blank, is activated by a blasting process and/or the thermal spraying of the mentioned material. In other words, the substrate material is roughened. This may be effected by means of a blasting method (with solids or water) or by machining such as turning, in which an undercut profile is produced by means of a geometric blade, for example. After applying the required layer thickness, the upper ring groove may, as mentioned, be at least partially formed out of the applied material.

In summary, the invention provides an extension of service life both of the piston and of the piston ring inserted into the upper annular groove, and both for diesel and petrol engines. Advantageously, due to the invention it is further no longer necessary to insert-cast a ring carrier, which is a technically elaborate process, so that this effort can be avoided by the invention. In particular, the effort is minimized by no longer requiring the manual insertion of the ring carrier into the casting mould, and in that the ring carrier as such has no longer to be externally purchased. Further, position and bonding errors that may occur during insert-casting of the ring carrier can be avoided. Moreover, the insert-casting of a ring carrier cannot be performed in those production processes which are advantageously used for pistons in petrol engines, that is die casting and forging processes. By means of the invention, these processes can be maintained, and the upper annular groove can be designed in a particularly wear-resistant manner in petrol engine pistons, too. The above-described wear protection layer thus advantageously forms an annular groove reinforcement.

Further, particular advantages can be achieved if the region of the fire land is initially at least partially recessed, and is finished after applying the wear protection layer. In other words, the region of the fire land can, in addition, be at least partially recessed already during production of the piston blank, or can be removed on the piston blank. By applying the wear protection layer also in the region of the fire land, the future fire land is at least partially formed by the wear protection layer. This makes also this region particularly wear-resistant and allows, in an advantageous manner, to reduce the height of the fire land so that the volume of the dead space can be minimized. Further, a combined effect becomes apparent here when trying to avoid a ring carrier. In fact, when the height of the fire land is reduced, for technical reasons the ring carrier can only be used with restrictions. In avoiding a ring carrier by means of the inventive method, the height of the fire land may be reduced in an advantageous manner without endangering the strength of the region of the upper annular groove. With respect to the above-described preferred method step according to which the region of the fire land is further at least partially recessed and finished after application of the wear protection layer, it has to be added that this step is independent form the method steps described in precedence, and may also be used on its own in a method for producing a piston. However, this method step may be combined with all previously and subsequently described method steps.

Further, it has turned out to be advantageous for the adhesion promoting layer to further comprise silicon.

Particularly good properties have been determined for the wear protection layer if the latter is formed by steel comprising at least one of the following alloy components: carbon in an percentage of 0.1 to 1.0%, chromium, molybdenum, nickel. By all of the mentioned alloy components a hardness of the wear protection layer is achieved that is greater than that of the base material of the piston, thus achieving the desired properties. In general, low-alloy steels, for example St08 having a carbon content of 0.1 to 1.0% are preferred, since in the application by thermal spraying comparatively high spray losses are encountered. The latter can be accepted as far as costs are concerned if a low-alloy steel is used. Such steel is comparatively cheap. As examples one can mention FeCr, FeCrMo and FeCrNi.

Further, good properties could be determined for the wear protection layer if it was formed by a copper or nickel layer, in particular NiCr or a high-alloy aluminium layer.

In first trials it could be determined that the wear protection layer can be applied particularly efficiently by APS (atmospheric plasma spraying), HVOF (High Velocity Oxygen Flame Spraying), electric arc wire spraying or wire flame spraying (combustion wire spraying). In particular electric arc wire spraying is currently preferred. For cost reasons, in particular with regard to the utilizable wire material and the application power, this method offers advantages and is, in a similar manner to the above-mentioned processing of the fire land, independent from the above-described method steps, but it may also be combined with the above-described method steps as well as with the method steps described in the following. A wear protection layer, not necessarily combined with an adhesion promoting layer and which is applied by electric arc wire spraying, is thus to be regarded as subject-matter of the application, with or without combination with the other method steps.

Further, in electric arc wire spraying different materials can be combined with each other by supplying two or more different wires. Preferably, a wire of aluminium and a further wire of iron are currently used. The two elements form a so-called pseudo alloy in the wear protection layer formed thereby. Good properties for the wear protection layer may already be achieved by supplying both wires, as is currently preferred, with corresponding feed so as to create a heterogeneous yet uniform mixture of aluminium and iron, for example. Alternatively, one can of course imagine a pure iron or aluminium layer.

Further advantages may, however, be achieved by varying the feed of at least one wire with the time of application of the wear protection layer. Thus, the concentration of at least one of the involved elements can be varied across the thickness of the wear protection layer, which increases with time. Particular advantages may be achieved in that those cases in which aluminium is accumulated in the region of the seam, that is in the regions directed to the inner side or to the piston blank. Thereby, the thermal expansion coefficient is advantageously compensated with respect to the base material of the piston which commonly is an aluminium alloy. Additionally, iron is accumulated in the so-called core or the future groove surface.

In an advantageous manner, the inventive method may additionally be used to at least partially form a cooling channel by introducing, prior to the application of the wear protection layer, a removable mass such as a salt mass into the recess, subsequently applying the wear protection layer and, finally, removing the removable mass so as to leave a cavity forming the cooling channel. Advantageously, the wear protection layer has a high surface porosity of up to 20 volume %, and it may thus be used as oil retention volume. Thus, in the inventive method also the laborious introduction of a salt core into the casting mould can be avoided, and may be replaced by the simpler introduction of the removable mass into the recess. With respect to this embodiment of the inventive method, the entire content of DE 10 2005 047 035 A1 of the applicant is incorporated herein by reference.

The above-mentioned object is further achieved by a piston as described in claim 10. This piston comprises, in correspondence to the above-described method of producing a base material, an adhesion promoting layer at least partially applied thereon and comprising aluminium, and a wear protection layer applied by thermal spraying, from which at least the upper annular groove is at least partially formed. The preferred embodiments of the inventive piston substantially correspond to those embodiments that can be produced by the above-described embodiments of the inventive method. Further, it is currently preferred that the wear protection layer has a thickness of up to 10 mm.

BRIEF DESCRIPTION OF THE DRAWINGS

In the following, an embodiment of the invention shown by way of example in the figures is explained in detail.

DETAILED DESCRIPTION OF A PREFERRED EMBODIMENT

Figure 1:
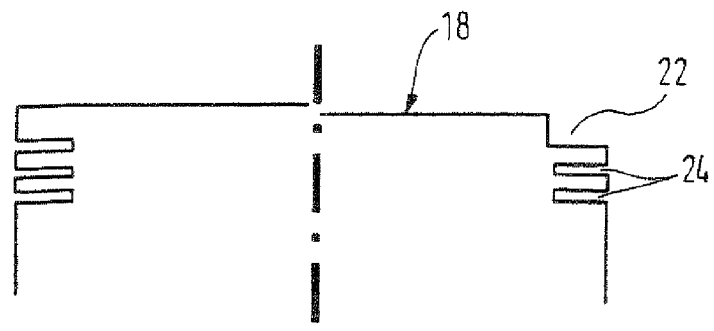
FIG. 1 shows a cross-section through the inventive piston prior to the application of a wear protection layer.

As can be seen from FIG. 1, the piston blank 18 shown on the right comprises a recess 22 in the region of the upper annular groove and the fire land. In all figures, a conventional piston is respectively shown on the left for comparison. Below the described recess 22, which serves for forming the upper annular groove and the fire land in the inventive piston, further annular grooves 24 are shown.

Figure 2:
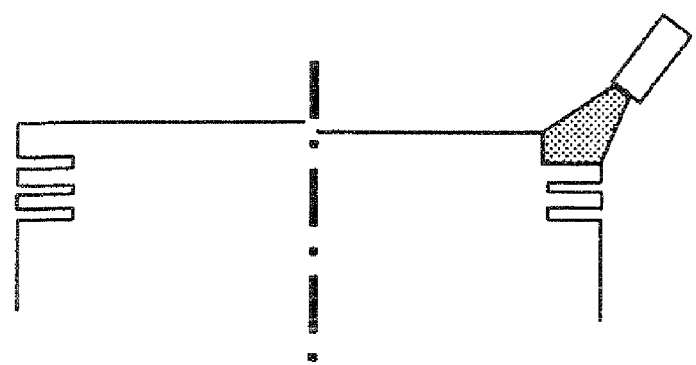
FIG. 2 shows a cross-section through the inventive piston during application of a wear protection layer.

As is schematically shown in FIG. 2, in the shown embodiment the recess 22 is initially almost completely filled with an adhesion promoting layer and is subsequently filled with a wear protection layer.

Figure 3:
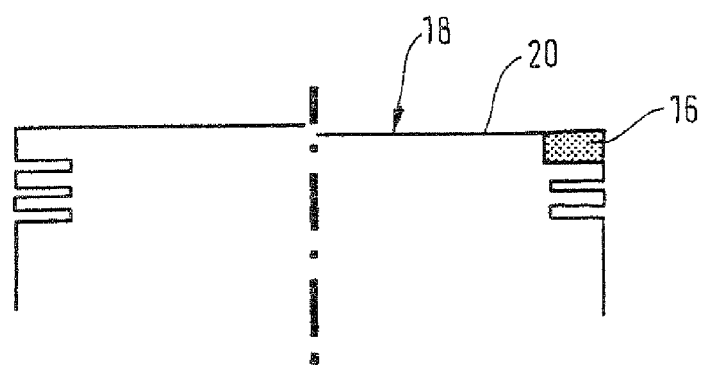
FIG. 3 shows a cross-section through the inventive piston having a wear protection layer applied thereon.

The wear protection layer is shown in FIG. 3 and designated by reference numeral 16. This wear protection layer is thus applied onto the base material 20 of the piston blank 18 and subsequently the upper annular groove 12 (see FIG. 4) can be formed therefrom.

Figure 4:
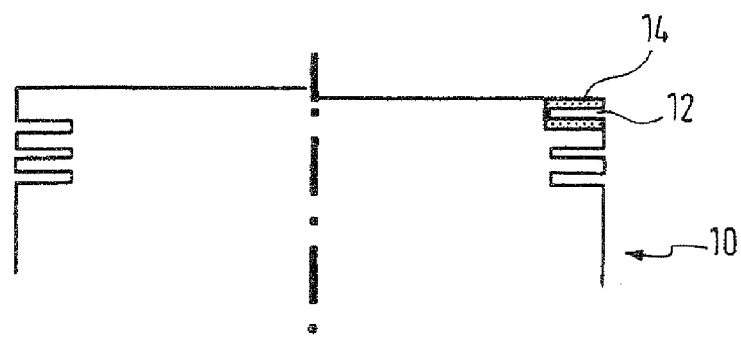
FIG. 4 shows the piston finished in the region of the upper annular groove and the fire lands.

As can be taken from FIG. 4, in the embodiment shown both shoulders of the upper annular groove 12 are formed by the particularly wear-resistant material of the wear protection layer 16. Further, the wear protection layer 16 forms the fire land 14, thus allowing to reduce the height of the latter. This can be seen from a comparison with the left half of FIG. 4.

The invention claimed is:

1. Method for producing an piston for an internal combustion engine wherein at least the region of an upper annular groove is at least partially recessed, subsequently an adhesion promoting layer containing aluminum is applied, whereafter a wear protection layer is thermally sprayed onto said adhesion promoting layer, wherein the wear protection layer is applied by electric arc wire spraying, in which two different wires are supplied, and wherein the feed of at least one wire is varied with the time of application of the wear protection layer, and wherein the wear protection layer includes a core and a seam, and iron is accumulated in the core and aluminum is accumulated in the seam, and at least the upper annular groove is at least partially formed therein.

2. The method of claim 1, the region of the fire land is at least partially recessed and is finished after the application of the wear protection layer.

3. The method of claim 1, wherein the adhesion promoting layer further comprises silicon.

4. The method according to claim 1, wherein the wear protection layer is at least partially steel comprising at least one of the following alloy components: carbon in a percentage of 0.1 to 1%, chromium, molybdenum, nickel.

5. The method according to claim 1, wherein the wear protection layer is at least partially a copper-based or nickel-based layer or a high-alloy aluminum layer.

6. The method according to claim 1, wherein in the electric arc wire spraying, a wire of aluminum and a wire of iron are supplied.

7. The method according to claim 1, wherein prior to application of the wear protection layer, a removable mass is introduced into the recess, which after application of the wear protection layer is removed, so that the resulting cavity forms a cooling channel.

8. A piston for an internal combustion engine comprising a base material, an adhesion promoting layer containing aluminum at least partially applied thereon and a wear protection layer thermally sprayed thereon, wherein the wear protection wear layer has a thickness and includes at least one component having a concentration, in which the concentration of the at least one component varies across the thickness, and wherein the wear protection layer includes a core and a seam, the core is enriched with iron and the seam is enriched with aluminum, and from which at least an upper annular groove is at least partially formed.

9. The piston of claim 8, including a fire land that is at least partially formed by the wear protection layer.

10. The piston of claim 8, wherein the adhesion promoting layer further comprises silicon.

11. The piston of claim 8, wherein the wear protection layer is at least partially steel, comprising at least one of the following alloy components: carbon in a percentage of 0.1 to 1%, chromium, molybdenum, nickel.

12. The piston of claim 8, wherein the wear protection layer is at least partially a copper-based or nickel-based layer or a high-alloy aluminum layer.

13. The piston of claim 8, wherein the wear protection layer is applied by means of APS (atmospheric plasma spraying), HVOS (high velocity oxygen flame spraying), electric arc wire spraying or wire flame spraying.

14. The piston of claim 8, wherein the wear protection layer has a thickness of up to 10 mm.

15. Piston according to claim 8, including a cooling channel, the inner surface of which is at least partially formed by the wear protection layer.

16. The method of claim 5, wherein the nickel-based layer comprises NiCr.

17. The piston of claim 12, wherein the nickel-based layer comprises NiCr.

\* \* \* \* \*